United States Patent
Schwald

(10) Patent No.: US 6,595,694 B2
(45) Date of Patent: Jul. 22, 2003

(54) BALL RACE FOR A SEAT BELT PRETENSIONER

(75) Inventor: Stephan Schwald, Hersching (DE)

(73) Assignee: Breed Automotive Technology, Inc., Lakeland, FL (US)

(*) Notice: Subject to any disclaimer, the term of this patent is extended or adjusted under 35 U.S.C. 154(b) by 47 days.

(21) Appl. No.: 09/873,022

(22) Filed: Jun. 1, 2001

(65) Prior Publication Data
US 2002/0079688 A1 Jun. 27, 2002

(30) Foreign Application Priority Data
Jul. 19, 2000 (DE) .................................. 100 35 117

(51) Int. Cl.$^7$ .............................................. F16C 19/16
(52) U.S. Cl. ...................... 384/476; 296/65 A; 428/627
(58) Field of Search ................................. 384/476, 624, 384/617; 428/627; 296/65 A

(56) References Cited

U.S. PATENT DOCUMENTS

| 3,014,745 A | 12/1961 | Kytta .......................... 292/252 |
| 3,219,228 A | 11/1965 | Sorensen ..................... 220/46 |
| 5,519,997 A | 5/1996 | Specht ........................ 60/632 |
| 5,961,222 A | * 10/1999 | Yabe et al. ................. 384/476 |

FOREIGN PATENT DOCUMENTS

| DE | 975667 | 4/1962 |
| DE | 2616019 | 10/1977 |
| GB | 2281189 | 10/1993 |

* cited by examiner

Primary Examiner—Lenard A. Footland
(74) Attorney, Agent, or Firm—Lonnie Drayer; Jarett Rieger

(57) ABSTRACT

A ball ring unit, in particular for reverse movement locks and seat belt systems has a plurality of locking balls arranged in a ring. The ring of locking balls has a covering that combines the locking balls to form a module. The ball ring unit can be used in a seat belt pretensioner.

7 Claims, 2 Drawing Sheets

BALL RACE FOR A SEAT BELT PRETENSIONER

FIELD OF THE INVENTION

The present invention relates to a ball ring unit for a seat belt pretensioner and a process for the manufacture of a ball ring unit.

BACKGROUND OF THE INVENTION

In seat belt systems, with seat belt pretensioners it is necessary to avoid a reverse movement of the seat belt after the pretensioning process. To this end, reverse movement locks are used in present seat belt systems. A reverse movement lock disclosed in U.S. Pat. No. 5,519,997 is formed by a ball ring that is located on a cone connected to the piston of the seat belt pretensioner inside a belt tightening tube. During the pretensioning process the balls are moved in the direction of the tapering space and dig into the inner wall of the belt tightening tube and the outer wall of the cone. As a result, a reverse movement of the piston and therefore a loosening of the seat belt is reliably avoided.

In the solution outlined above, the assembly of the locking balls has proved to be difficult. As the locking balls have to be inserted individually in the intermediate space between the cone and the inner wall of the belt tightening tube, this process is time consuming and expensive.

SUMMARY OF THE INVENTION

By providing a covering or sheath the balls or locking balls can be combined to form a subassembly "ball ring unit" before assembly of the balls. As a result the ball ring unit can be slid onto the cone of a reverse movement lock simply and in an extremely short period of time.

There is provided in accordance with the present invention a ball ring for a seat belt pretensioner comprising a plurality of locking balls arranged in a ring, the ring of locking balls having a covering that combines the locking balls to form a module.

DETAILED DESCRIPTION OF THE INVENTION

The terms used in the description of the embodiments "left", "right", "above" and "below" relate to an orientation of the drawings with normally legible figure references.

Figure 1:
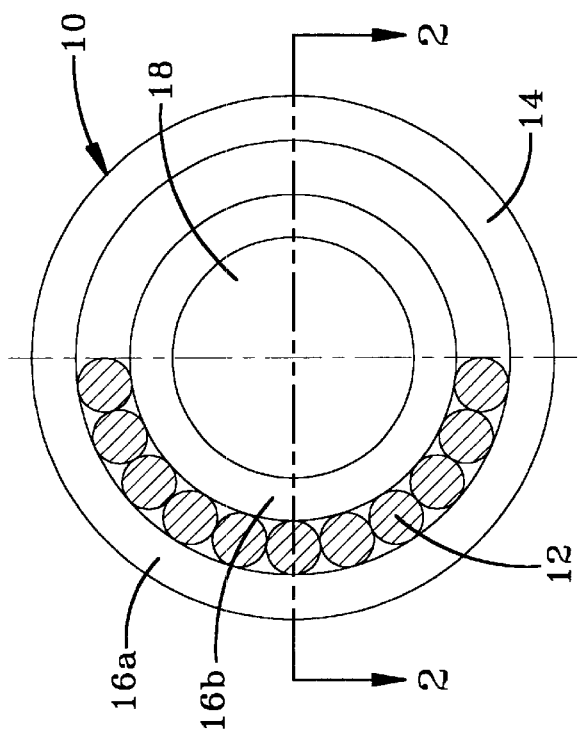
FIG. 1 is a front view of a first embodiment of a ball ring unit according to the invention.

The first embodiment of a ball ring unit 10 according to the invention shown in FIG. 1 has a total of 22 locking balls 12 which all have the same diameter and are preferably manufactured from a metal or metal alloy. The locking balls are arranged to form a ring that is enclosed by a covering or sheath 14. As a result the locking balls, which are used for example as a reverse movement lock for a seat belt pretensi6ner of a seat belt system, are combined to form a module which can be preassembled and is easy to mount and which can be assembled simply.

The covering 14 can be formed by different elements such as a plastic film 14a, 14b. The ball ring unit can be easily manufactured if the film forming the covering can be welded. In order to maintain a stable annular form it further advantageous if the film forming the covering can be welded under vacuum. Furthermore, it is possible that the film forming the covering is a shrink film. A particularly simple manufacture can be achieved if two films are used for the covering.

Figure 3:
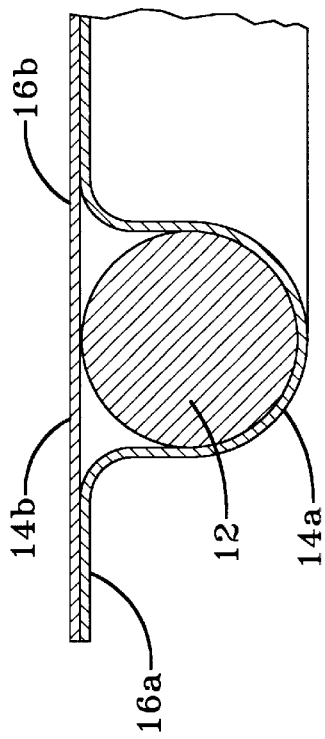
FIG. 3 is an enlarged sectional view of a detail contained in the circle denoted by B in FIG. 2.
Figure 2:
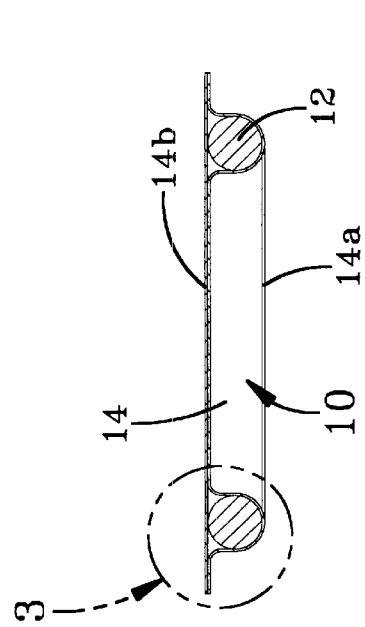
FIG. 2 is a sectional view of the ball ring unit shown in FIG. 1 along the line 2—2.

In a first embodiment the covering 14 is formed by a first and second film 14a, 14b (see FIG. 3) preferably manufactured from a plastics material. The two films are optionally welded to one another under vacuum both on the inner periphery of the ring and on the outer periphery of the ring along a weld seam which extends preferably uninterrupted in the shape of a ring in each case. If the films are shrink films, the welding of the two films can be connected simultaneously to a shrinking process.

Figure 4:
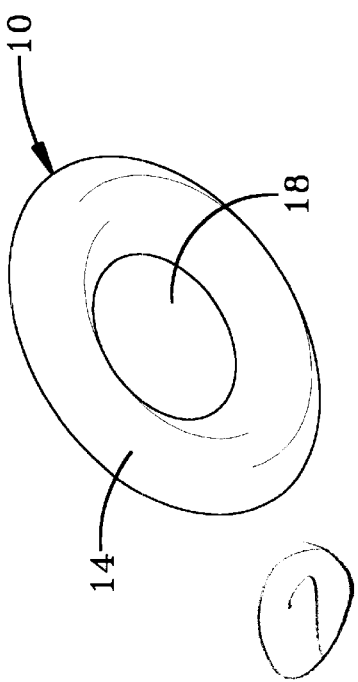
FIG. 4 is a perspective, schematic view of the ball ring unit shown in FIG. 1.

In FIG. 1 the ball ring unit 10 has a rim pointing radially outward and radially inward 16a, 16b on the outer side and inner side of the ring in each case to avoid damage to the covering and therefore a change in the position of the individual balls within the ball ring. The rim 16a pointing radially outward, and the rim 16b pointing radially inward, follow the contour of the ring from the locking balls 12 with their free sides in each case. This rim preferably has a width of 0.5 mm to 5 mm, in particular approximately 2 mm. If a rim projecting inwards and a rim projecting outwards are present, it is furthermore advantageous if these are of the same width. The rim 16b pointing radially inwards encloses a central hole 18 (see FIGS. 1 and 4) by which the ball ring unit 10 can be slid onto a component upon which it is to be assembled, for example on a cone of a piston in a seat belt pretensioner. In the same way, the ball ring unit 10 can be slid by means of the central hole 18 onto a rod for mounting and the like. It is furthermore advantageous if the inner peripheral face of either the first or the second ring part extends at an angle to the ball ring central axis, the greater internal diameter of this ring part being provided on the front end pointing to the other ring part. This permits the assembly of the ball ring unit on a cone.

The two rims 16a, 16b preferably have the same width, measured in the radial direction of the ring of locking balls 12, which is approximately 2 mm in the embodiment shown and take up the above-mentioned weld seams. The rims 16a, 16b can be produced for example by a punching process to which the ball ring unit 10 is subjected after the welding of the two films 14a, 14b to punch out the ball ring unit 10 from the associated webs of films 14a, 14b and to remove surplus film from the ball ring unit 10.

One of the two rims, 16a or 16b or both rims can be bent approximately 90° in the central axis direction of the ball ring unit 10. As a result, hindrance upon assembly of the ball ring unit 10 by the two rims is avoided. If two rims, i.e. a radially inward and a radially outward pointing rim, are present, this bending can be in the same or opposite direction.

The ball ring unit 10 outlined above is manufactured as described below.

First a single piece of film or a portion of an intermittently supplied web of the first film 14a is applied to a mold (not shown further) in such a way that the mold is completely covered. The mold has an annular recess such that the film assumes an annular form. The diameter of the recess corresponds in this case to the desired diameter of the ring of locking balls 12.

Simultaneously with the application onto the mold or immediately thereafter the first film 14a is sucked into the annular recess by a vacuum. In the case of a web that can be supplied intermittently, its width is dimensioned correspondingly so that after suction the mold is still completely covered by the web and a sufficient portion of material remains in order to form the outer rim 16a in the desired width. Provided a piece of film is used, the size of this piece and its form is dimensioned in accordance with the diameter of the later ball ring unit 10, the dimensions being selected in particular so that the ball ring unit 10 according to the invention can be punched out of the first and second film 14a, 14b with formation of the outer rim 16a.

Subsequently the locking balls 12, previously arranged in a ring, are inserted into the annular recess by suitable means, for example a magnetic tool, and applied to the first film 14a. Thereafter the second film 14b, which can also be supplied as a single piece or by means of an intermittently advanceable web, is applied to the first film 14a and the ring of locking balls 12. The two films are then welded to one another along both the outer periphery and the inner periphery of the ring of the locking balls 12. This welding can optionally take place under vacuum and when using shrink films by a shrinking process.

The ball ring unit 10 according to the invention is thereafter punched out of the two films 14a, 14b, the central hole 18 being produced in particular in the inside of the ball ring unit 10.

It should be noted that the punching out could take place both inside of and outside of the mold. The rims 16a, 16b formed as a result of the punching out are subsequently bent by approximately 90° in the direction of the central axis of the ball ring unit 10.

Put another way, the ball ring unit can be manufactured by applying the balls or locking balls forming the ball ring on a first film in annular form, which film is arranged in an annular recess of a mold, optionally by means of vacuum. The second film is subsequently applied to the ball ring and to the first film, then the two films are welded to one another and the ball ring unit formed from ball ring and covering is punched out of the remaining film residues. The punching out can take place in such a manner that two rims, i.e. a radially outward pointing rim and a radially inward pointing rim, remain. There is of course the possibility of also providing only a single rim.

A further possibility of manufacturing a ball ring unit 10 according to the invention with a covering of one or two films will be described below with the aid of a further embodiment not shown in more detail, the only the differences from the above-described embodiment being dealt with. In this embodiment a single film piece or an intermittently supplied film web is applied to a mold which has a straight-running recess, rather than an annular recess. With regard to the selection of the dimensions of the film piece or of the film web the same conditions apply as described above in conjunction with the first embodiment. Put another way, in this alternative manufacturing process the locking balls forming the ball ring are initially applied in a straight line on a film which is arranged in a linearly extending recess of a mold, optionally by means of a vacuum, turning over this film into a tube enclosing the locking balls, closing the two ends of the web and the longitudinal side by means of suitable welding seams, for example, and subsequently bending the thus formed tube in the form of a ball ring, the welded ends being connected to one another once again for example by a welding process.

In contrast to the first embodiment, in order to achieve a ball ring unit with the same ring diameter, only 21 locking balls are applied to the film sucked into the mold. The place of the 22nd ball is taken by the welded ends of the web. Subsequently the film inserted into the mold can be turned over the ball string. If a film web is used, an appropriate film element is to be cut from the web before this turning over. It is also possible to apply a second film to the row of locking balls and to the first film.

A weld seam is thereafter provided on both front ends of the row of locking balls and, depending on whether one or two films were used, on one side or on both sides along the row of locking balls. Subsequently the thus formed "ball tube" is removed from the mold and shaped into a ring. The two weld seams on the front ends of the "ball tube" take the place, in this case, of the 22nd locking ball of the first embodiment and are welded to one another. A further punching process can optionally follow this. The ball ring unit thus formed has one or two rims depending on the number of films used.

A further embodiment of a ball ring unit $10^1$ according to the invention shown in FIGS. 5 to 7 will be explained below. In this case, in contrast to the first embodiment, both functionally and geometrically identical components are characterised by the same reference numerals and only functionally identical components with the same reference numeral are supplemented by the mark "$^1$".

Figure 7:
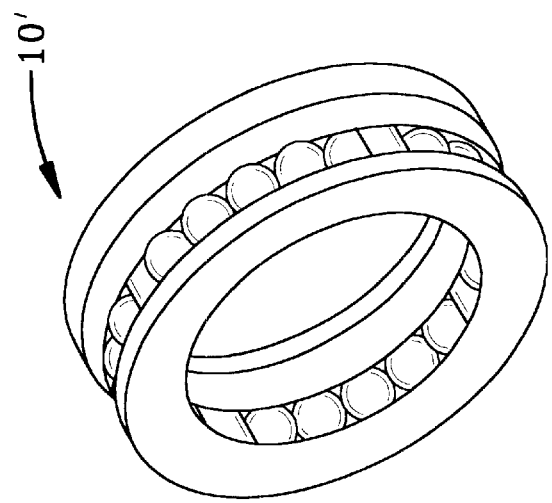
FIG. 7 is a perspective view of the ball ring unit shown in FIG. 5.
Figure 6:
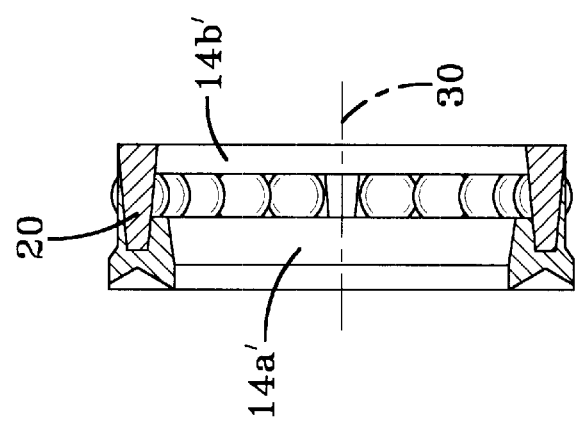
FIG. 6 is a sectional view along the line 6—6 in FIG. 5.
Figure 5:
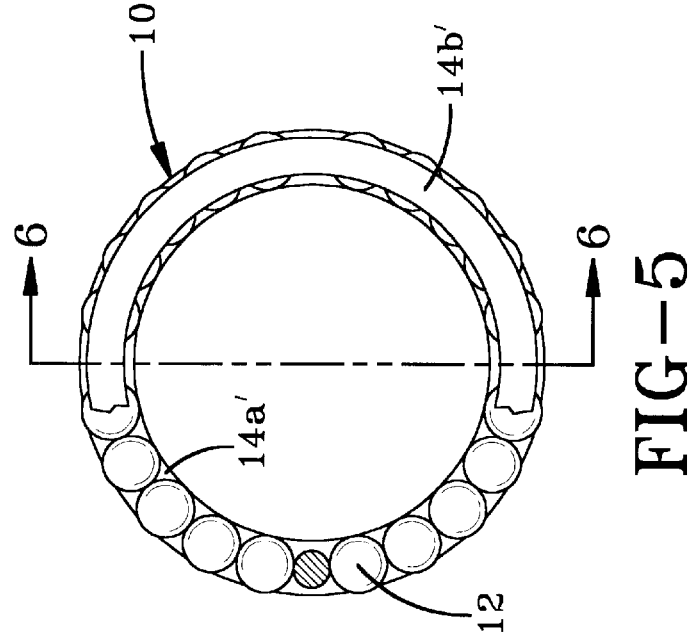
FIG. 5 is a partially sectional top view of a second embodiment of a ball ring unit according to the invention.

In FIGS. 5 to 7 a ball ring unit $10^1$ according to the invention is distinguished in that first and second ring parts $14a^1$, $14b^1$, preferably made from plastics material, are provided for the covering $14^1$ instead of one or two films. At least one connecting element 20 extends at least approximately parallel to the ball ring axis and is arranged on either the first or the second ring part $14a^1$, $14b^1$, and is preferably formed as one piece with this and preferably engages in an at least partially corresponding recess in the other ring part, the second or first ring part. In the embodiment shown in FIGS. 5 to 7 the two ring parts $14a^1$, $14b^1$ are firmly or rigidly connected to one another by four connecting elements 20 and between them receive twenty locking balls 12. In contrast to the "film solution" this solution permits a stiffer configuration of the ball ring unit, whereby damage to the ball ring unit, for example during transport or assembly is lessened.

The four connecting elements 20 are formed on the second ring part $14b^1$ as one piece and extend substantially parallel to the central axis 30 of the ring of locking balls 12. Their free ends, which are not shown in more detail, are tapered and engage in correspondingly formed recesses of the first ring part $14a^1$ that are also not described in more detail. They can be fixed in the recesses by means of ultrasound welding, gluing and the like, for example.

As emerges in particular from FIG. 5, the four connecting elements 20 are arranged at an angle of 90° to one another in each case. The diameter of the connecting element is smaller than the diameter of the locking balls 12 as can also be seen from FIG. 5. Their diameter is preferably half that of the ball diameter. A particularly compact ball ring unit according to the invention can be achieved when the connecting element is arranged between two adjacent locking balls.

To save material while maintaining safe functionality, that either the first or the second ring part has a width measured in the radial direction of the ball ring that is smaller than the diameter of the locking balls. This configuration further enhances the assembly of the ball ring unit according to the invention on a cone, for example the cone of a piston in a seat belt pretensioner. The first ring part $14a^1$ has a width measured in the radial direction which corresponds approximately to the diameter of the locking balls 12. Its outer and inner peripheral surfaces extend in axis direction of the ball ring in the shape of a truncated cone, the base of the cone pointing to the second ring part $14b^1$.

The second ring part $14b^1$ has a width, also measured in the radial direction, which is smaller than the diameter of the locking balls 12. As a result, the truncated cone-shaped inner contour of the ball ring unit $10^1$ is extended so that this can be placed on a cone of a piston in a seat belt pretensioner, the first ring part $14a^1$ with its inner peripheral face, the locking balls 12 and the inner peripheral face of the second ring part $14b^1$ resting on the cone.

It should be noted that the first and second ring parts $14a^1$, $14b^1$ have concave recesses on their end faces, which face one another in each case, in which the locking balls 12 are arranged. This ensures a secure guidance of the locking balls.

The two ring parts can be detachably or non-detachably connected to one another. In the case of a non-detachable connection there is the possibility of connecting the two ring parts to one another by ultrasound welding or by gluing and the like.

It will thus be seen that certain changes may be made in the above described embodiments without departing from the scope of the invention, and it is intended that all matter contained in the above description of shown in the accompanying drawings shall be interpreted as illustrative and not in a limiting sense.

I claim:

1. A ball ring unit for a seat belt pretensioner, said ball ring unit comprising a ball ring having a plurality of locking balls arranged in a ring and a first film and second film, wherein the first film and second film form a covering for the ball ring whereby the first film is fixedly attached to the second ring.

2. The ball ring unit according to claim 1 wherein the film forming the covering is a shrink film.

3. The ball ring unit according to claim 1 wherein the film forming the covering is welded.

4. The ball ring unit according to claim 1 wherein a portion of the first film surrounded by the ball ring and a portion of the second film surrounded by the ball ring form a radially inwards rim, wherein the first film is fixedly attached to the second film at the radially inwards rim.

5. The ball ring unit according to claim 4 wherein a portion of the first film surrounding the ball ring and a portion of the second film surrounding the ball ring form a radially outwards rim, wherein the first film is fixedly attached to the second film at the radially outwards rim.

6. The ball ring unit according to claim 5 wherein the rim projecting inwards and the rim projecting outwards have the same width.

7. The ball ring unit according to claim 5 wherein the rim pointing radially inwards and the rim pointing radially outwards are bent in opposite directions.

\* \* \* \* \*